United States Patent
Garcia et al.

(10) Patent No.: US 10,187,690 B1
(45) Date of Patent: Jan. 22, 2019

(54) SYSTEMS AND METHODS TO DETECT AND CORRELATE USER RESPONSES TO MEDIA CONTENT

(71) Applicant: GOPRO, INC., San Mateo, CA (US)

(72) Inventors: Vincent Garcia, Issy-les-Moulineaux (FR); Tom Medioni, Paris (FR); Matthieu Rouif, Paris (FR); Gabriel Lema, Paris (FR); Francescu Santoni, Bastia (FR)

(73) Assignee: GoPro, Inc., San Mateo, CA (US)

( * ) Notice: Subject to any disclaimer, the term of this patent is extended or adjusted under 35 U.S.C. 154(b) by 2 days.

(21) Appl. No.: 15/495,099

(22) Filed: Apr. 24, 2017

(51) Int. Cl.
*H04N 21/442* (2011.01)
*H04N 21/44* (2011.01)
*H04N 21/431* (2011.01)
*G06K 9/00* (2006.01)

(52) U.S. Cl.
CPC ... *H04N 21/44218* (2013.01); *G06K 9/00255* (2013.01); *G06K 9/00288* (2013.01); *G06K 9/00302* (2013.01); *H04N 21/4312* (2013.01); *H04N 21/44008* (2013.01)

(58) Field of Classification Search
CPC ............. H04N 21/27; H04N 21/4223; H04N 21/44218; H04N 21/478; H04N 21/6582; H04N 21/4312; H04N 21/44008; G06K 9/00302; G06K 9/00288; G06K 9/00255
See application file for complete search history.

(56) References Cited

U.S. PATENT DOCUMENTS

| | | |
|---|---|---|
| 5,130,794 A | 7/1992 | Ritchey |
| 6,337,683 B1 | 1/2002 | Gilbert |
| 6,593,956 B1 | 7/2003 | Potts |
| 7,222,356 B1 | 5/2007 | Yonezawa |
| 7,483,618 B1 | 1/2009 | Edwards |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |

(Continued)

FOREIGN PATENT DOCUMENTS

| | | |
|---|---|---|
| WO | 2001020466 | 3/2001 |
| WO | 2009040538 | 4/2009 |

OTHER PUBLICATIONS

Ricker, "First Click: TomTom's Bandit camera beats GoPro with software" Mar. 9, 2016 URL: http://www.theverge.com/2016/3/9/11179298/tomtom-bandit-beats-gopro (6 pages).

(Continued)

*Primary Examiner* — Chenea Smith
(74) *Attorney, Agent, or Firm* — Sheppard Mullin Richter & Hampton LLP (57) ABSTRACT

Systems and method of automatically detecting user responses from users to media content and correlating the user responses to the media content include a determination of an emotional response by a user—for example a smile—to a presentation of media content. The determined emotional response is correlated to the media content. Subsequent presentation of the same media content includes presentation of an indicator—for example a smiley ☺ —that indicates the determined emotional response.

18 Claims, 5 Drawing Sheets

(56) References Cited

U.S. PATENT DOCUMENTS

| | | |
|---|---|---|
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,564,173 B2 | 2/2017 | Swenson |
| 2004/0128317 A1 | 7/2004 | Sull |
| 2005/0025454 A1 | 2/2005 | Nakamura |
| 2005/0289582 A1* | 12/2005 | Tavares .............. G06K 9/00221 725/10 |
| 2006/0122842 A1 | 6/2006 | Herberger |
| 2007/0173296 A1 | 7/2007 | Hara |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0253735 A1 | 10/2008 | Kuspa |
| 2008/0313541 A1 | 12/2008 | Shafton |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2012/0317592 A1* | 12/2012 | Kim .................. H04N 21/27 725/14 |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0259399 A1 | 10/2013 | Ho |
| 2013/0263002 A1 | 10/2013 | Park |
| 2013/0268955 A1* | 10/2013 | Conrad .............. H04N 21/252 725/12 |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |

(56) References Cited

U.S. PATENT DOCUMENTS

| | | | |
|---|---|---|---|
| 2016/0225410 A1 | 8/2016 | Lee | |
| 2016/0234345 A1 | 8/2016 | Roberts | |
| 2016/0358207 A1* | 12/2016 | Montaque | G06Q 30/0245 |
| 2016/0358603 A1 | 12/2016 | Azam | |
| 2016/0366330 A1 | 12/2016 | Boliek | |
| 2017/0006214 A1 | 1/2017 | Andreassen | |
| 2017/0098122 A1* | 4/2017 | el Kaliouby | A61B 5/744 |
| 2017/0140214 A1* | 5/2017 | Matas | G06K 9/00315 |
| 2017/0171614 A1* | 6/2017 | el Kaliouby | H04N 21/44218 |
| 2017/0208362 A1* | 7/2017 | Flores | H04N 21/44218 |

OTHER PUBLICATIONS

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., "Deep Residual Learning for Image Recognition," arXiv:1512.03385, 2015, 12 pgs.

Iandola et al., "SqueezeNet: AlexNet-level accuracy with 50x fewer parameters and <0.5MB model size," arXiv:1602.07360, 2016, 9 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Ioffe et al., "Batch Normalization: Accelerating Deep Network Training by Reducing Internal Covariate Shift," arXiv:1502.03167, 2015, 11 pgs.

Parkhi et al., "Deep Face Recognition," Proceedings of the British Machine Vision, 2015, 12 pgs.

PCT International Preliminary Report on Patentability for PCT/US2015/023680, dated Oct. 4, 2016, 10 pages.

PCT International Search Report and Written Opinion for PCT/US15/12086 dated Mar. 17, 2016, 20 pages.

PCT International Search Report and Written Opinion for PCT/US2015/023680, dated Oct. 6, 2015, 13 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 Pages.

Schroff et al., "FaceNet: A Unified Embedding for Face Recognition and Clustering," IEEE Conference on Computer Vision and Pattern Recognition (CVPR), 2016, 10 pgs.

Tran et al., "Learning Spatiotemporal Features with 3D Convolutional Networks", arXiv:1412.0767 [cs.CV] Dec. 2, 2014 (9 pgs).

Yang et al., "Unsupervised Extraction of Video Highlights via Robust Recurrent Auto-encoders" arXiv:1510.01442v1 [cs.CV] Oct. 6, 2015 (9 pgs).

Ernoult, Emeric, "How to Triple Your YouTube Video Views with Facebook", SocialMediaExaminer.com, Nov. 26, 2012, 16 pages.

PCT International Search Report and Written Opinion for PCT/US15/18538, dated Jun. 16, 2015, 26 pages.

PCT International Search Report for PCT/US17/16367 dated Apr. 14, 2017 (2 pages).

PCT International Search Reort for PCT/US15/18538 dated Jun. 16, 2015 (2 pages).

* cited by examiner

SYSTEMS AND METHODS TO DETECT AND CORRELATE USER RESPONSES TO MEDIA CONTENT

FIELD

This disclosure relates to systems and methods for automatically detecting user responses, in particular emotional responses, from users to media content and correlating the detected user responses to the media content for future presentations.

BACKGROUND

Sharing media content, including videos, between different users in a network and/or other platform is at the root of social media. Typical feedback from users may include one or more of votes, likes, comments, and/or other types of affirmative and/or deliberate user feedback.

SUMMARY

This disclosure relates to systems and methods for automatically detecting user responses, in particular emotional responses, from users to media content and correlating the detected user responses to the media content for analysis and/or to supplement and/or enhance future presentations of the same media content. In some implementations, the detected user responses may be used when creating new media content, e.g. by combining portions of media content to which one or more users have responded.

In some implementations, media content may include videos. In some implementations, media content may include one or more of audio content, video content, animated content, photos, slideshows, digital graphics, and/or any combinations thereof. As used herein, the term "content" may refer to both self-contained electronic files, streaming information, and/or other types of content, as well as combinations thereof. For example, the term audio content may include electronic audio files, audio streaming, etc. As used herein, the term "user response" may refer to a physical response, an emotional response, and/or any combination of physical and emotional response. As used herein, a reaction by a user may be referred to as a response by the user.

A system that detects user responses may include one or more physical processors, and/or other components. The one or more physical processors may be configured by machine-readable instructions. As used herein, the term "processor" is used interchangeably with the term "physical processor." Executing the machine-readable instructions may cause the one or more physical processors to facilitate detection of user responses to media content and correlation of the detected user responses to the media content. The machine-readable instructions may include one or more computer program components. The computer program components may include one or more of an access component, a storage component, a response component, a correlation component, a presentation component, a capture component, a classification component, an annotation component, a transfer component, and/or other computer program components.

The access component may be configured to facilitate access by users to media content, including but not limited to video content. In some implementations, access by users may be implemented as access to client computing platforms that are associated with the users. For example, a first user may be associated with a first client computing platform, a second user with a second client computing platform, a third user with a third client computing platform, and so forth. Access to media content may be implemented through one or more communicative links and/or couplings with one or more networks. For example, a particular communicative link may involve a wireless or wired connection to the internet. For example, access by a first user to a particular item of media content may be implemented as one or more transmissions of information over one or more networks to the first client computing platform. Such transmissions may originate from one or more computing platforms (e.g. servers) that manage and/or control storage of the particular item of media content. For example, the particular item of media content may be electronically stored in electronic storage that is related to one or more computing platforms (e.g. servers). In some implementations, in this example, access may be implemented as the establishment of a communicative link from electronic storage via the one or more networks to the first client computing platform. In some implementations, access may be managed and/or controlled with information security in mind. For example, access may include authentication, authorization, verification, identification, combinations thereof, and/or other types of information security.

The storage component may be configured to facilitate access to electronic storage. The storage component may be configured to store information in electronic storage, including but not limited to digital and/or electronic information.

The presentation component may be configured to present media content to users. For example, presentations may be presented through a display and/or speaker of a computing device. In some implementations, presentation of media content may include other types of visual and/or audio reproduction. For example, a particular item of media content may be projected by a (computing) device onto a screen, wall, and/or other surface. For example, a particular video may be presented to a user on his or her smartphone.

The capture component may be configured to capture visual information. In some implementations, the capture component may operate in conjunction with a camera and/or another type of sensor. In some implementations, the capture component may be configured to capture visual information during presentation of media content to a user. For example, the captured visual information may include a facial expression and/or a type of body language of a user. For example, the captured visual information may include a change in facial expression and/or a change in body language of a user.

In some implementations, the capture component may be configured to capture information that conveys a state and/or change of a user response. For example, a change in heartbeat or pupil dilation of a user may indicate a user response, such as fear or excitement. Other types of biometric information may be considered within the scope of this disclosure. In some implementations, captured information may be time-stamped. For example, a particular facial expression that is expressed and captured at a particular moment and/or range of moments (during presentation of particular media content to a particular user) may be associated with a timestamp and/or a range of timestamps.

The classification component may be configured to determine and/or perform classifications of captured information, including but not limited to captured visual information such as, for example, facial expressions of users. In some implementations, classifications may involve a set of available options. For example, a small set of available options for classifying facial expressions may include categories for "smiling" and "frowning," or, more generally, "happy" and "sad". A more elaborate set of available options for classifying facial expressions may include categories for "happy," "sad," "smiling," "angry," "shocked," "disgusted," and/or other options. In some implementations, the set of available options may include options that correspond to some or all of a set of small digital pictures or pictorial symbols that represents a thing, feeling, concept, etc., used in text messages and other electronic communications and usually part of a standardized set, which may be referred to as emojis. As used herein, an emoji may be a small digital picture or pictorial symbol that represents a thing, feeling, concept, etc., used in text messages and other electronic communications and usually part of a standardized set. In some implementations, a particular user may express multiple facial expression and/or other emotions during presentation of a particular item of media content. Accordingly, the classification component may be configured to perform multiple classifications such that individual classifications correspond to individual expressed emotions and/or individual items of captured information. In some implementations, individual classifications may be associated with individual timestamps and/or individual ranges of timestamps. In some implementations, classifications by the classification component may be used by other components, tools, applications and/or systems that may benefit from access to knowledge regarding the classifications of information captured when users are presented with media content. For example, information regarding moments of interest may be used for automatic trimming of videos, automatic selection of a subset of videos, automatic selection of videos that elicit a similar response, automatic selection of music for one or more videos and/or a compilation of videos, automatic selection of a thematic style and/or a rendering style for one or more videos and/or a compilation of videos, and/or other uses.

The response component may be configured to determine response information that reflects user responses, in particular user responses to presentations. In some implementations, response information may identify classifications, e.g. as determined and/or performed by the classification component. In some implementations, response information may identify a particular element from a standardized set of available options for classification. In some implementations, response information may identify a particular element from a standardized set of emojis. For example, in some implementations, the set of available options for classification may include eight different options. Accordingly, each of the eight different options may be uniquely encoded and/or indexed by three bits of information (since $2^3=8$). This numerical example is not intended to be limiting in any way.

The correlation component may be configured to correlate and/or otherwise associate response information to media content. For example, a particular item of response information may be correlated with a particular item of media content. In some implementations, correlation may be accomplished in such a way that subsequent use of the particular item of media content may include and/or use information that is based on the particular item of response information. In some implementations, correlation may be accomplished in such a way that subsequent presentation of the particular item of media content includes information that is based on the particular item of response information. In some implementations, correlation may be accomplished in such a way that subsequent presentation of the particular item of media content is accompanied by a supplemental presentation that includes information that is based on the particular item of response information. The supplemental presentation may be contemporaneous with the presentation of the particular item of media content. In some implementations, correlation may be implemented by linking different types of information. In some implementations, correlation may be implemented by including different types of information in a single file or document. Different implementations for correlations and/or associations may be considered within the scope of this disclosure, provided that a subsequent presentation of the particular item of media content may include, be accompanied by, and/or otherwise be related to information that is based on the particular item of response information.

The annotation component may be configured to aggregate response information. For example, the annotation component may be configured to aggregate multiple items of response information into an aggregated set (or an aggregated item) of response information. In some implementations, subsequent use of the particular item of media content may include and/or use information that is based on the aggregated set of response information. For example, the annotation component may aggregate multiple items of response information that identify the same or similar classifications of user responses into a single item of response information. For example, if three users had a similar happy smiling-face expression at the same moment during presentation of a particular video, the aggregated response information may reflect a smiling face that is bigger, brighter, animated, shown longer, and/or otherwise distinguishable from an individual item of response information. In some implementations, multiple items of response information may be aggregated even though the corresponding user responses occurred at different moments during the presentation of a particular video. In some implementations, an aggregated set of response information may be specific to an individual item of media content. The annotation component may be configured to adjust, re-determine, and/or otherwise modify an aggregated set of response information in response to additional (or newly available) response information. For example, two users may have had a similar happy smiling-face expression during presentations of a particular video, such that the aggregated response information may reflect a smiling face. Subsequently, a third user may have had a different facial expression (e.g. angry) during a presentation of the particular video. In response, the annotation component may modify the aggregated response information.

In some implementations, response information from one or more users may be used to detect and/or otherwise determine moments of interest in one or more items of media content. For example, a user may use his own response information (i.e. responses captured when the user was watching the particular video) to detect moments of interest (and/or as a basis for automatic detection of moments of interest) in a particular video, and subsequently use these detected moments of interest to create a highlight reel from the particular video (e.g., a shortened version of the particular video that includes one or more moments that correspond to one or more particular emotional responses). For example, the user may select one or more particular classifications of his own emotional responses, e.g. "happy" and "smiling," and effectuate automatic detection of those moments of interest in a particular video that correspond to the selected classifications. Media content corresponding to the detected moments of interest may be used as a basis for a compilation video. For example, the user may select one or more different classifications and effectuate automatic detection of the moments of interest in a particular video that correspond to those different classifications. In some implementations, a user may use his own response information to detect moments of interest (and/or as a basis for automatic detection of moments of interest) in a (selected) set of videos, and subsequently use these detected moments of interest to create a highlight reel from the set of videos (e.g., a compilation that includes moments from different videos in the set of videos such that the moments correspond to emotional responses). In some implementations, a user may use responses captured when other users were watching one or more particular videos to detect moments of interest (and/or as a basis for automatic detection of moments of interest) in the one or more particular videos, and subsequently use these detected moments of interest to create a highlight reel (e.g., a compilation that includes moments from different videos).

The transfer component may be configured to facilitate transfer of information between computing platforms and/or devices. For example, the transfer component may facilitate transfer of information between different client computing platforms. For example, the transfer component may facilitate transfer of information between a computing platform and electronic storage. For example, the transfer component may facilitate transfer of information between a computing platform and one or more networks. In some implementations, the transferred information may include response information. In some implementations, the transferred information may include visual information, information related to a classification by the classification component, and/or other types of information.

As used herein, any association (or relation, or reflection, or indication, or definition, or correspondency) involving information, media content, presentations, emotional responses, facial expressions, classifications, response information, response indicators, parameters, thresholds, functions, vectors, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
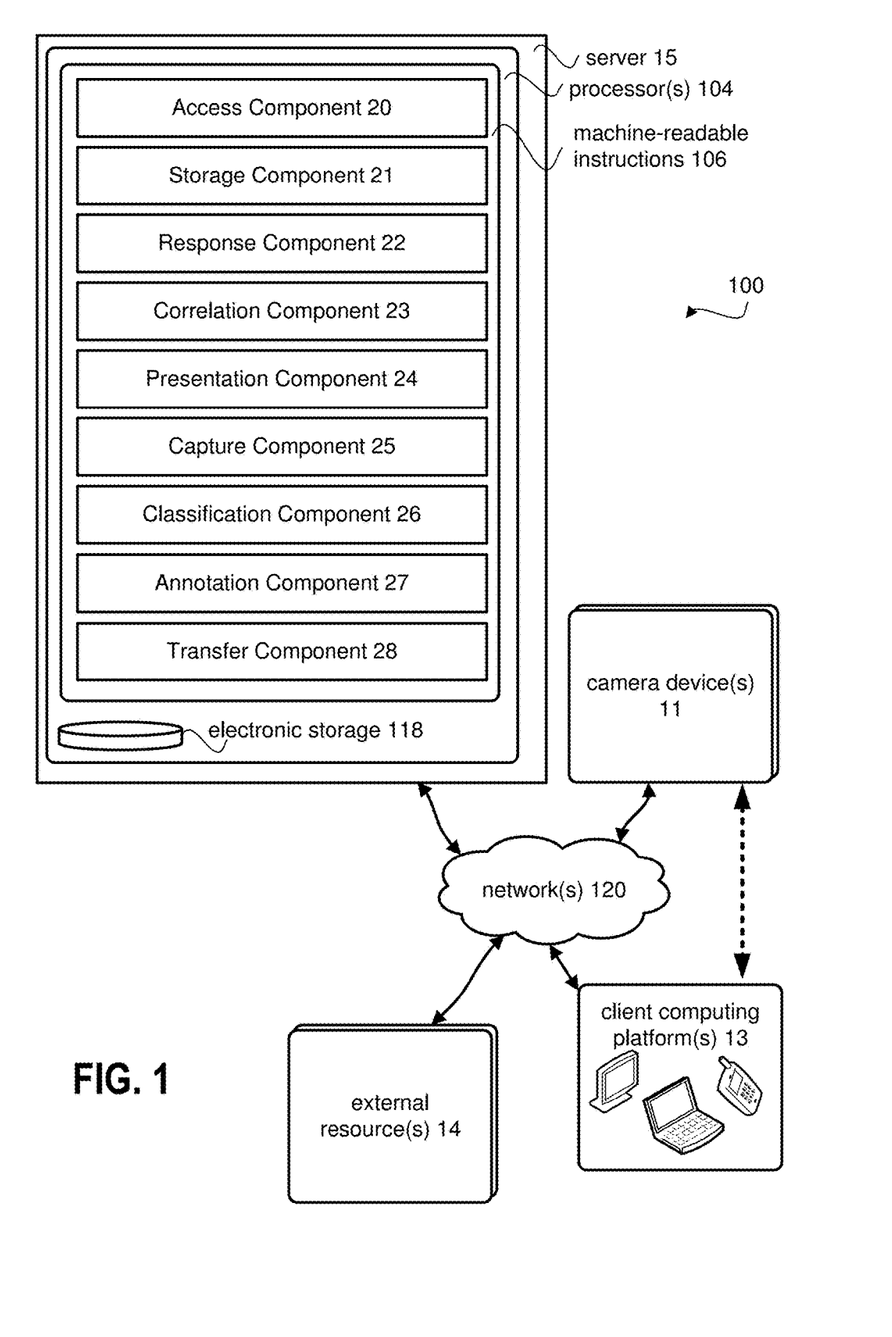
FIG. 1 illustrates a system configured to automatically detect user responses from users to media content and correlate the user responses to the media content, in accordance with one or more implementations.

FIG. 1 illustrates a system 10 configured to automatically detect user responses, in particular emotional responses, from users to media content and correlate the detected user responses to the media content for analysis and/or to supplement and/or enhance future presentations of the same media content, in accordance with one or more implementations. In some implementations, the detected user responses may be used when creating new media content, e.g. by combining portions of media content to which one or more users have responded. In some implementations, the detected user responses may be used to determine moments of interest in one or more items of media content. For example, information regarding moments of interest may be used for automatic trimming of videos, automatic selection of a subset of videos, automatic selection of videos that elicit a similar response, automatic selection of music for one or more videos and/or a compilation of videos, automatic selection of a thematic style and/or a rendering style for one or more videos and/or a compilation of videos, and/or other uses.

System 10 may include one or more of a computing platform 15, one or more client computing platforms 17, one or more processors 11, electronic storage 12, a user interface 13, one or more camera devices 14, one or more external resources 16, one or more networks 120, and/or other components. In some implementations, system 10 may include fewer components. Electronic storage 12 may include electronic storage media configured to electronically store information. Electronic storage 12 may store software algorithms, information determined by processor 11, information received remotely, and/or other information that enables system 10 to function properly. For example, electronic storage 12 may store information related to one or more of images, videos, media content, templates, image exemplars, response information, and/or other information.

Processor 11 may be configured to provide information-processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured by machine-readable instructions 100. Executing machine-readable instructions 100 may cause processor 11 to automatically detect user responses, in particular emotional responses, from users to media content and correlate the detected user responses to the media content for analysis and/or to supplement and/or enhance future presentations of the same media content. Machine-readable instructions 100 may include one or more computer program components. Machine-readable instructions 100 may include one or more of an access component 20, a storage component 21, a response component 22, a correlation component 23, a presentation component 24, a capture component 25, a classification component 26, an annotation component 27, a transfer component 28, and/or other computer program components.

Access component 20 may be configured to facilitate access by users to media content, including but not limited to video content. In some implementations, access by users may be implemented as access to client computing platforms 17 and/or computing platform 15. For example, client computing platforms 17 may include a first client computing platform 17a, a second client computing platform 17b, a third client computing platform 17c, and so forth. Client computing platforms 17 may be associated with the users. For example, a first user may be associated with first client computing platform 17a, a second user with second client computing platform 17b, a third user with third client computing platform 17c, and so forth. Access to media content may be implemented through one or more communicative links and/or couplings with one or more networks 120. For example, a particular communicative link may involve a wireless or wired connection to the internet. For example, access by a first user to a particular item of media content may be implemented as one or more transmissions of information over one or more networks 120 to client computing platform 17. Such transmissions may originate from one or more computing platforms (e.g. computing platform 15 and/or one or more servers) that manage and/or control storage of the particular item of media content. For example, the particular item of media content may be electronically stored in electronic storage 12, which may be related to one or more computing platforms (computing platform 15 and/or one or more servers). In some implementations, in this example, access may be implemented as the establishment of a communicative link from electronic storage 12 via one or more networks 120 to client computing platform 17. In some implementations, access may be managed and/or controlled by using information security techniques. For example, access may include authentication, authorization, verification, identification, combinations thereof, and/or other types of information security.

Storage component 21 may be configured to facilitate access to electronic storage 12. Storage component 21 may be configured to store information in electronic storage 12, including but not limited to digital and/or electronic information. In some implementations, features of storage component 21 and access component 20 may be combined in a single component or system, e.g. a file access system configured to manage access to electronically stored files.

Figure 2:
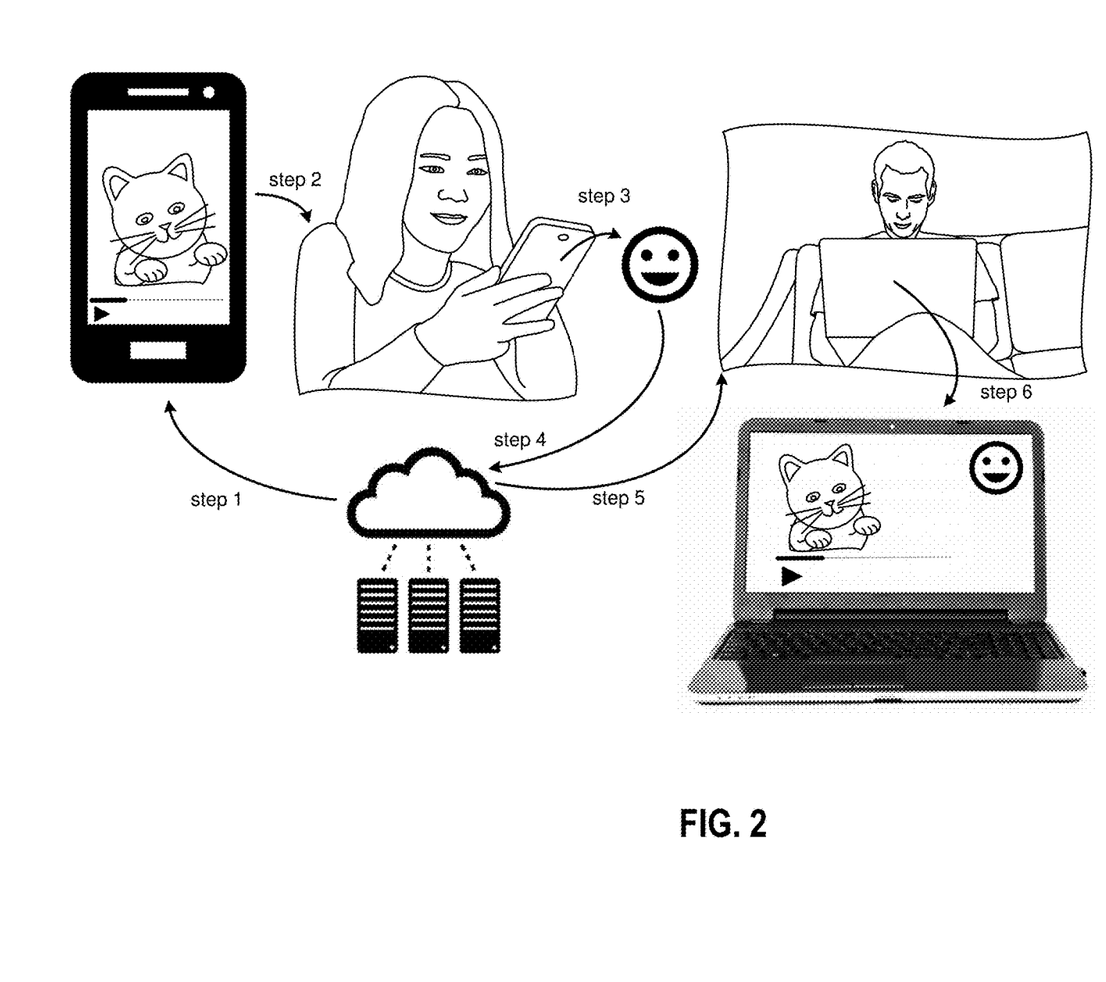
FIGS. 2-3-4 illustrate examples of use-case scenarios for a system and method to automatically detect user responses from users to media content and correlate the user responses to the media content, in accordance with one or more implementations.

By way of non-limiting example, FIG. 2 illustrates an example of a use-case scenario for a system such as system 10. As depicted in FIG. 2, computing platform 15 is a network-connected server system performing tasks of a file access system. The cloud shape in FIG. 2 may indicate network connectivity, e.g. through the internet. In particular, computing platform 15 in FIG. 2 may be configured to perform features attributed herein to storage component 21 and access component 20. For example, as shown in step 1 of FIG. 2, computing platform 15 may be configured to facilitate access by the user of client computing platform 17a to particular media content. As depicted in FIG. 2, the particular media content may be a video that includes the image shown on the display of client computing platform 17a. As depicted in FIG. 2, the display of client computing platform 17a may include a user interface configured to facilitate user interaction. For example, the display of client computing platform 17a may include a playback control button that initiates playback of a video. By way of non-limiting example, the playback control button may have a triangular shape, as depicted in the bottom left corner of the display of client computing platform 17a. For example, the display of client computing platform 17a may include a progress bar that indicates progress of playback of a video. By way of non-limiting example, the progress bar may be positioned near the bottom of the display of client computing platform 17a. The image shown in FIG. 2 corresponds to a particular moment in the video, which may be referred to as a first time, or ti, which may be indicated along the progress bar. The use of playback controls (such as a triangular playback control button) and progress bars are common for user interfaces that are used for controlling video playback. As depicted in FIG. 2, client computing platform 17a may include front-facing camera device 14.

Presentation component 24 may be configured to present media content to users. For example, presentations may be presented through a display and/or speaker of a computing device, including but not limited to client computing platforms 17. In some implementations, presentation of media content may include other types of visual and/or audio reproduction. For example, a particular item of media content may be projected by a (computing) device onto a screen, wall, and/or other surface. For example, a particular video may be presented to a user on his or her smartphone.

By way of non-limiting example, FIG. 2 depicts presentation of media content through the display of client computing platform 17a.

Capture component 25 may be configured to capture visual information. In some implementations, capture component 25 may operate in conjunction with a camera such as camera device 14 and/or another type of sensor 14a. In some implementations, capture component 25 may be configured to capture visual information during presentation of media content to a user. For example, the captured visual information may include a facial expression and/or a type of body language of a user. For example, the captured visual information may include a change in facial expression and/or a change in body language of a user. In some implementations, camera device 14 may be embedded, integrated, and/or otherwise include in client computing platform 17. For example, a smartphone may be a client computing platform that includes a (front-facing) camera device. During presentation of media content to a user, a front-facing camera device may capture visual information that includes the face of the user.

Captured information may include one or more of visual content, audio content, and/or other content. The visual content may be in the form of individual frame images in a set of multiple frame images. An individual frame image may include an array of pixels. The multiple frame images may be presented in an ordered sequence. The audio content may include recorded and/or provided audio that may accompany visual content. The audio content may be synchronized with visual content.

In some implementations, visual content may be defined by one or more of real-world visual information, electronic information, playback information, and/or other information. Real-world visual information may comprise information related to light and/or electromagnetic radiation incident on an image sensor of camera device 14, and/or other information. Electronic information may comprise information related to information stored by in electronic storage 12 that conveys the light and/or electromagnetic radiation incident on an image sensor and may constitute a conversion of the real-world visual information to information suitable for electronic storage. Playback information may comprise information that may facilitate visual reproduction of the captured real-world visual information on a computing platform (e.g. client computing platforms 17) and/or other display device for viewing by a user, and/or other information. By way of non-limiting example, playback information may comprise a different format of the electronic information that may be readable by a playback device.

In some implementations, audio content may be defined by one or more of real-world audio information, electronic information, playback information, and/or other information. Real-world audio information may comprise information related to sound waves incident on a sound transducer and/or other sensor of a computing device (such as client computing platform 17), and/or other information. Electronic information may comprise information stored in electronic storage 12 that may constitute a digital conversion of the real-world audio information to electronic information (e.g., an audio file). Playback information may comprise information that facilitates audible reproduction of captured real-world audio information on a computing platform and/or other audio reproduction device, and/or other information. By way of non-limiting example, playback information may comprise a different format of the electronic information that may be readable by a playback device.

The captured visual information may depict and/or include a facial expression of the user and/or another emotional response of the user. For example, a user may look away from the smartphone, roll their eyes, and/or perform another action that may be interpreted as an emotional response (or that may be indicative of an emotional response).

In some implementations, capture component 25 may be configured to capture information that conveys a state and/or change of a user response. For example, a change in heartbeat or pupil dilation of a user may indicate a user response, such as fear or excitement. Other types of biometric information may be considered within the scope of this disclosure. For example, sensor 14*a* may be a biometric sensor. In some implementations, captured information may be time-stamped. For example, a particular facial expression that is expressed and captured at a particular moment and/or range of moments (during presentation of particular media content to a particular user) may be associated with a timestamp and/or a range of timestamps. For example, a smartwatch may be a client computing platform that includes a biometric sensor. In some implementations, a change in a user's emotional response may be captured and/or detected based on a change in the user's facial expression. In some implementations, a change in a user's emotional response may be captured and/or detected based on a change in the user's biometric measurement. In some implementations, a change in a user's emotional response may be captured and/or detected based on a combination of the user's facial expression and the user's biometric measurement.

By way of non-limiting example, FIG. 2 depicts capturing visual information that indicates a user response, the capturing being performed by camera device 14 of client computing platform 17*a*. For example, as shown in step 2 of FIG. 2, the user of client computing platform 17*a* has an emotional response to particular media content. In particular, the user in step 2 is smiling. This user may be referred to as the first user in FIG. 2.

Classification component 26 may be configured to determine, interpret, and/or perform classifications of captured information, including but not limited to captured visual information such as, for example, facial expressions of users.

In some implementations, classifications may involve a set of available options. For example, a small set of available options for classifying facial expressions may include categories for "smiling" and "frowning," or, more generally, "happy" and "sad". A more elaborate set of available options for classifying facial expressions may include categories for "happy," "sad," "smiling," "angry," "shocked," "disgusted," and/or other options. In some implementations, the set of available options may include options that correspond to some or all of a set of small digital pictures or pictorial symbols that represents a thing, feeling, concept, etc., used in text messages and other electronic communications and usually part of a standardized set, which may be referred to as emojis. In some implementations, a particular user may express multiple facial expression and/or other emotions during presentation of a particular item of media content. Accordingly, classification component 26 may be configured to perform multiple classifications such that individual classifications correspond to individual expressed emotions and/or individual items of captured information. In some implementations, individual classifications may be associated with individual timestamps and/or individual ranges of timestamps.

In some implementations, determining and/or interpreting a facial expression from captured visual information may include one or more steps of recognizing different facial components, including but not limited to eyes, nose, mouth, etc. In some implementations, determining and/or interpreting a facial expression from captured visual information may include one or more steps of determining spatial relationships between different facial components, such as, for example, the shape and/or position of a user's eyebrows or lips in relation to the rest of the facial features. For example, the corners of a user's mouth may be positioned lower for a frown than for a smile. For example, whether the user's teeth are visible in a smile may indicate the user's level of enthusiasm related to a particular smile or other emotional response. For example, the arc, slope, and/or direction of one or both of the user's eyebrows may indicate surprise, anger, and/or another indicator for one or more emotional responses. In some implementations, by combining individual interpretations of individual facial components, more complex emotional responses (and/or more reliable determinations of certain facial expressions) may be detected. For example, when the user's eyebrows and the user's mouth both indicate anger, a determination of an angry facial expression may be deemed likely and/or reliable.

In some implementations, system 10 may be configured to solicit users' feedback for a classification. Users' feedback may be used to improve classifications among a group of users, or on a user-by-user individual basis. For example, system 10 may be configured to learn a particular user's facial expressions based on feedback from the particular user.

By way of non-limiting example, FIG. 2 depicts a classification of a captured emotional response by a user. For example, as shown in step 3 of FIG. 2, the captured emotional response is classified as a smile and/or as a particular type of smiley selected from a set of emojis.

Response component 22 may be configured to determine response information that reflects user responses, in particular user responses to presentations. In some implementations, response information may identify or otherwise correspond to classifications, e.g. as determined and/or performed by classification component 26. In some implementations, response information may identify a particular element from a standardized set of available options for classification. In some implementations, response information may identify a particular element from a standardized set of emojis. For example, in some implementations, the set of available options for classification may include eight different options. Accordingly, each of the eight different options may be uniquely encoded and/or indexed by three bits of information (since $2^3=8$). This numerical example is not intended to be limiting in any way. In some implementations, determined response information may include descriptions, representations, and/or definitions of one or more elements from a (standardized) set of available options for classification.

By way of non-limiting example, FIG. 2 depicts determined response information that reflects (a classification of) a captured emotional response by a user. For example, as shown in step 3 and/or step 4 of FIG. 2, the determined response information may be smiley selected from a set of emojis.

Referring to FIG. 1, correlation component 23 may be configured to correlate and/or otherwise associate response information to media content. For example, a particular item of response information may be correlated with a particular item of media content. In some implementations, correlation may be accomplished in such a way that subsequent use of the particular item of media content may include and/or use information that is based on the particular item of response information. In some implementations, correlation may be accomplished in such a way that subsequent presentation of the particular item of media content includes information that is based on the particular item of response information. In some implementations, correlation may be accomplished in such a way that subsequent presentation of the particular item of media content is accompanied by a supplemental presentation that includes information that is based on the particular item of response information. The supplemental presentation may be contemporaneous with the presentation of the particular item of media content. In some implementations, correlation may be implemented by linking different types of information. In some implementations, correlation may be implemented by including different types of information in a single file or document. Different implementations for correlations and/or associations may be considered within the scope of this disclosure, provided that a subsequent presentation of the particular item of media content may include, be accompanied by, and/or otherwise be related to information that is based on the particular item of response information.

By way of non-limiting example, FIG. 2 depicts correlation of response information to media content. For example, as shown in step 4 of FIG. 2, the determined response information may be transferred to and/or stored by computing platform 15. The response information and/or information defining its correlation to a particular item of media content may be stored in electronic storage that is included in and/or controlled by computing platform 15. In some implementations, the correlation may be performed in such a way that a subsequent presentation of the particular item of media content (as depicted by step 5 and/or step 6, presenting the same video on client computing platform 17c of a different user and to the different user) may include, be accompanied by, and/or otherwise be related to information (e.g. a smiley in the top right corner of the display of client computing platform 17c) that is based on the particular item of response information of step 4. Step 6 depicts both the presentation of the video (at the same particular moment in the video: ti) and the presentation of the information that is based on the emotional response of the first user, as classified in step 3 (i.e. the smiley). The presentations in step 6 are performed on client computing platform 17c, in particular on the display thereof. The user associated with client computing platform 17c may be referred to as the second user or the end-user in FIG. 2. The presentations in step 6 are performed subsequent to client computing platform 17c accessing information on computing platform 15 (this accessing step is depicted as step 5).

Annotation component 27 may be configured to aggregate response information. For example, annotation component 27 may be configured to aggregate multiple items of response information into an aggregated set (or an aggregated item) of response information. In some implementations, subsequent use of the particular item of media content may include and/or use information that is based on the aggregated set of response information. For example, annotation component 27 may aggregate multiple items of response information that identify the same or similar classifications of user responses into a single item of response information. For example, if three users had a similar happy smiling-face expression at the same moment during presentation of a particular video, the aggregated response information may reflect a smiling face that is bigger, brighter, animated, shown longer, and/or otherwise distinguishable from an individual item of response information. In some implementations, multiple items of response information may be aggregated even though the corresponding user responses occurred at different moments during the presentation of a particular video. In some implementations, an aggregated set of response information may be specific to an individual item of media content. Annotation component 27 may be configured to adjust, re-determine, and/or otherwise modify an aggregated set of response information in response to additional (or newly available) response information. For example, two users may have had a similar happy smiling-face expression during presentations of a particular video, such that the aggregated response information may reflect a smiling face. Subsequently, a third user may have had a different facial expression (e.g. angry) during a presentation of the particular video. In response, annotation component 27 may modify the aggregated response information. In some implementations, operations by annotation component 27 may be limited to a subset of all users. For example, the subset may be automatically determined by system 10 (e.g. based on social media connections, geographical information, demographic information, and/or other information distinguishing certain users from other users). In some implementations, the subset may be determined, at least in part, under control of a particular user, such as the user originating the video, or the end-user in FIG. 3.

In some implementations, response information from one or more users may be used to detect and/or otherwise determine moments of interest in one or more items of media content. For example, a user may use his own response information (i.e. responses captured when the user was watching the particular video) to detect moments of interest (and/or as a basis for automatic detection of moments of interest) in a particular video, and subsequently use these detected moments of interest to create a highlight reel from the particular video (e.g., a shortened version of the particular video that includes one or more moments that correspond to one or more particular emotional responses). For example, the user may select one or more particular classifications of his own emotional responses, e.g. "happy" and "smiling," and effectuate automatic detection of those moments of interest in a particular video that correspond to the selected classifications. Media content corresponding to the detected moments of interest may be used as a basis for a compilation video. For example, the user may select one or more different classifications and effectuate automatic detection of the moments of interest in a particular video that correspond to those different classifications. In some implementations, a user may use his own response information to detect moments of interest (and/or as a basis for automatic detection of moments of interest) in a (selected) set of videos, and subsequently use these detected moments of interest to create a highlight reel from the set of videos (e.g., a compilation that includes moments from different videos in the set of videos such that the moments correspond to emotional responses). In some implementations, a user may use responses captured when other users were watching one or more particular videos to detect moments of interest (and/or as a basis for automatic detection of moments of interest) in the one or more particular videos, and subsequently use these detected moments of interest to create a highlight reel (e.g., a compilation that includes moments from different videos).

Referring to FIG. 1, transfer component 28 may be configured to facilitate transfer of information between computing platforms and/or devices. For example, the transfer component may facilitate transfer of information between different client computing platforms (such as, by way of non-limiting example, between client computing platform 17*a* and client computing platform 17*b*). For example, the transfer component may facilitate transfer of information between computing platform 15 and electronic storage 12. For example, transfer component 28 may facilitate transfer of information between computing platform 15 and one or more networks 120. In some implementations, the transferred information may include response information. In some implementations, the transferred information may include visual information, information related to a classification by classification component 26, and/or other types of information. In some implementations, transfer component 28 may include a transceiver configured to transfer information between computing platforms and/or devices. In some implementations, one or more features attributed to transfer component 28 may be implemented by a transceiver configured to transfer information between computing platforms and/or devices. For example, the transceiver may include one or more antennae, an analog-to-digital converter, a digital-to-analog converter, encoding hardware, decoding hardware, buffers, electronic storage, a power supply, and/or other hardware components, as well as software configured to support the functionality of these hardware components. The transceiver may include fewer components or additional components not listed herein.

Figure 3:
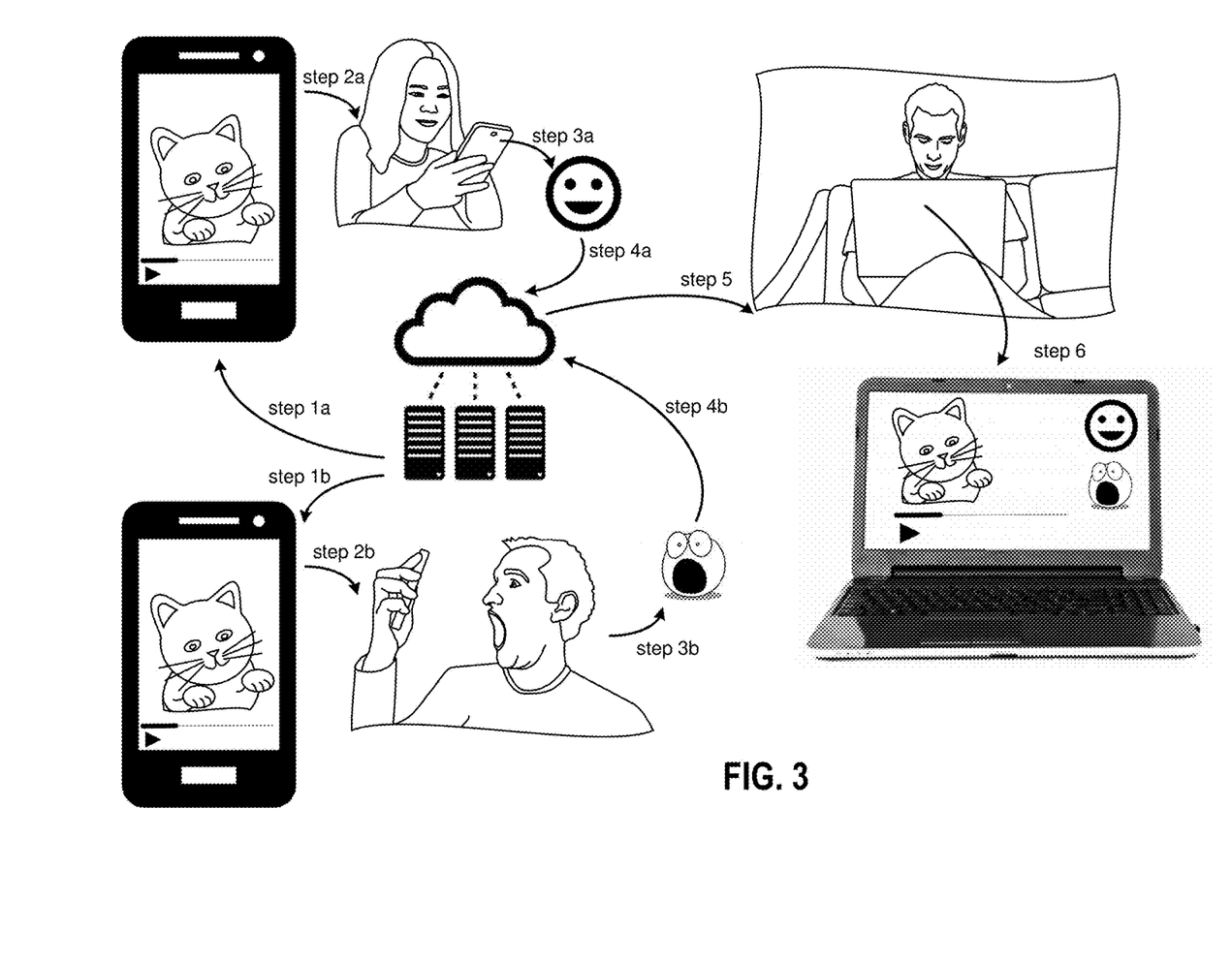

By way of non-limiting example, FIG. 3 illustrates an example of a use-case scenario for a system such as system 10. Some elements in FIG. 3 are the same as or similar to elements in FIG. 2. For example, computing platform 15 in FIG. 3 is a network-connected server system performing tasks of a file access system. Step 1*a* shown in FIG. 3 is similar to step 1 shown in FIG. 2, and involves showing particular media content on the display of client computing platform 17*a* (which is associated with a first user). Likewise, step 2*a*, 3*a*, and 4*a* shown in FIG. 3 are similar to steps 2, 3, and 4 shown in FIG. 2. Additionally, step 1*b* is similar to step 1*a*, except the particular media content is shown on the display of client computing platform 17*b* (which is associated with a second user who is different from the first user in FIG. 3). Step 2*b* is similar to step 2*a*, except the second user has a different emotional response to the particular media content. In particular, the second user appears to be shocked. Step 3*b* is similar to step 3*a*, except the classification of the captured emotional response by the second user is (or reflects) a particular type of emoji that is related to, associated with, and/or otherwise corresponds to the emotional response of the second user in FIG. 3. Step 4*b* is similar to step 4*a*, except the determined response information for the second user that reflects the classification related to step 3*b* is different from the determined response information for the first user. As shown in step 4*b* of FIG. 3, the determined response information for the second user may be transferred to and/or stored by computing platform 15. The determined response information and/or information defining its correlation to a particular item of media content may be stored in electronic storage that is included in and/or controlled by computing platform 15. In some implementations, there may be no fixed temporal relationship between the steps involving the first and the second user. In some cases, the first user may participate in steps 1*a*, 2*a*, 3*a*, and 4*a* before the second user participates in steps 1*b*, 2*b*, 3*b*, and 4*b*. In some cases, the opposite may be true. In some cases, participation in individual steps may be interleaved. Each presentation of the particular item of media content to an individual user may lead to a captured emotional response, a classification thereof, a determination of corresponding response information, and/or a correlation as described herein. Subsequent to the correlation of the determined response information for the first user with the particular item of media content, and further subsequent to the correlation of the determined response information for the second user with the same particular item of media content, steps 5 and 6 in FIG. 3 are similar to steps 5 and 6 in FIG. 2. As shown, the same video is presented on client computing platform 17*c* of a different user and to the different user. This user may be referred to as the third user or the end-user, and may be different from the first user and second user in FIG. 3. The presentation in step 6 may include, be accompanied by, and/or otherwise be related to information (e.g. an emoji in the top right corner of the display of client computing platform 17*c*) that is based on the particular item of response information of step 4*a*. In addition, the presentation in step 6 may include, be accompanied by, and/or otherwise be related to information (e.g. another emoji just below the top right corner of the display of client computing platform 17*c*) that is based on the particular item of response information of step 4*b*. Step 6 depicts both the presentation of the video (at the same particular moment as depicted in steps 1*a* and 1*b*) and the presentation of the information that is based on the emotional responses of the first user and the second user, as classified in steps 3*a* and 3*b*, respectively. The presentations in step 6 are performed on client computing platform 17*c*, in particular on the display thereof.

The third user can see, during the presentation of the video, one or more representations of emotional responses of other users to the same video. In some implementations, captured emotional responses may be associated with one or more timestamps, and the presentation of the information that is based on the captured emotional responses may be synchronized and/or otherwise aligned with the one or more timestamps. In some implementations, the timestamps may be used to detect and/or otherwise determine moments of interest. For example, the third user may be able to select particular portions of the video based on the number and/or type of corresponding emotional responses from other users. For example, in some implementations, the third user may be able to select one or more particular portions of the video based on which portion is deemed the funniest or the most shocking, as may be determined automatically by analyzing and/or otherwise aggregating information based on the emotional responses of multiple viewers of the same video. In some implementations, the third user may be able to select and/or otherwise filter a subset of the users of system 10, and analyze and/or otherwise aggregate information based on the emotional responses of the selected subset of viewers.

Figure 4:
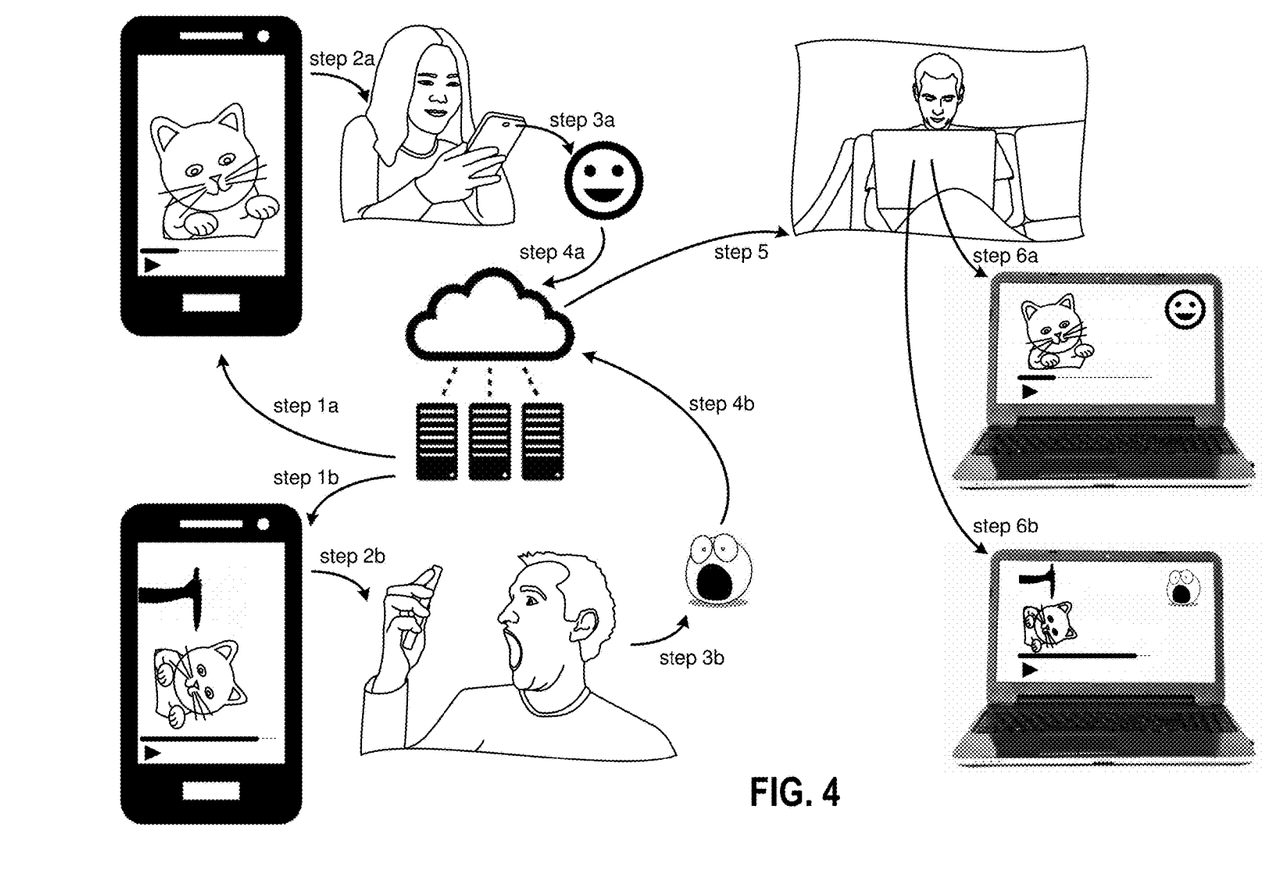

By way of non-limiting example, FIG. 4 illustrates an example of a use-case scenario for a system such as system 10. Some elements in FIG. 4 are the same as or similar to elements in FIG. 4. For example, computing platform 15 in FIG. 4 is a network-connected server system performing tasks of a file access system. Step 1a shown in FIG. 4 is similar to step 1a shown in FIG. 3, and involves showing particular media content on the display of client computing platform 17a (which is associated with a first user). Likewise, step 2a, 3a, and 4a shown in FIG. 4 are similar to steps 2a, 3a, and 4a shown in FIG. 3. Additionally, step 1b, 2b, 3b, and 4b shown in FIG. 4 are similar to steps 1b, 2b, 3b, and 4b shown in FIG. 3, except the emotional response of the second user is captured at a different moment in the video, as depicted by the different progress bars on the displays of client computing platforms 17a and 17b. As shown in FIG. 4, the second user has a different emotional response from the first user to the particular media content. Subsequent to the correlation of the determined response information for the first user with the particular item of media content, and further subsequent to the correlation of the determined response information for the second user with the same particular item of media content, steps 5, 6a, and 6b in FIG. 4 are similar to steps 5 and 6 in FIG. 3. As shown, the same video is presented on client computing platform 17c of a different user and to the different user. This user may be referred to as the third user or the end-user, and may be different from the first user and second user in FIG. 4. The presentation in step 6a may include, be accompanied by, and/or otherwise be related to information (e.g. an emoji in the top right corner of the display of client computing platform 17c) that is based on the particular item of response information of step 4a. In addition, the presentation in step 6b may include, be accompanied by, and/or otherwise be related to information (e.g. another emoji in the top right corner of the display of client computing platform 17c) that is based on the particular item of response information of step 4b. Step 6a depicts both the presentation of the video (at the same particular moment as depicted in step 1a) and the presentation of the information that is based on the emotional responses of the first user, as classified in step 3a. Step 6b depicts both the presentation of the video (at the same particular moment as depicted in step 1b) and the presentation of the information that is based on the emotional responses of the second user, as classified in step 3b. The presentations in steps 6a and 6b are performed on client computing platform 17c, in particular on the display thereof.

In some implementations, processor 11 may be included in one or more of a server (not shown), a computing platform (e.g. computing platform 15), a capture device (e.g. camera device 14), and/or other devices. By way of non-limiting illustration, a server may include processor 11 and may communicate with computing platforms via client/server architecture and/or other communication scheme. The server may be configured to provide features and/or functions of processor 11 to users via computing platforms. In some implementations, one or more features and/or functions of processor 11 may be attributed to individual computing platforms associated with users. By way of non-limiting illustration, individual computing platforms may obtain machine-readable instructions that are the same or similar to machine-readable instructions 100 such that features and/or functions of processor 11 may be carried out locally at the individual computing platforms. In some implementations, one or more features and/or functions of processor 11 may be attributed to individual capture devices. By way of non-limiting illustration, individual capture devices may obtain machine-readable instructions that are the same or similar to machine-readable instructions 100 such that features and/or functions of processor 11 may be carried out locally at the individual capture devices. For example, one or more features attributed to capture component 25, classification component 26, and/or response component 22 may be performed locally at individual client computing platforms 17.

Computing platforms may include, by way of non-limiting example, client computing platforms, desktop computers, a laptop computers, a handheld computers, NetBooks, mobile telephones, smartphones, tablets, (smart) watches, personal medical devices, mobile computing platforms, gaming consoles, televisions, electronic devices, and/or other computing platforms. It is noted that in some implementations, system 10 may include one or more servers, one or more computing platforms, one or more capture devices, and/or other components described herein yet not explicitly shown in FIG. 1.

External resources 16 may include sources of information, hosts and/or providers of virtual environments outside of system 100, external entities participating with system 10, and/or other resources. In some implementations, some or all of the functionality attributed herein to external resources 16 may be provided by resources included in system 10.

Camera device 14 may be configured for one or both of video capture and/or image capture. Camera device 14 may include one or more sensors coupled to camera device 14, and/or other components. A sensor may be coupled to camera device 14 by virtue of being attached to camera device 14 and/or in communication with camera device 14. In some implementations, sensors coupled to camera device 14 may include one or more of an image sensor, a geolocation sensor, a motion sensor, a sound transducer, an environment sensor, a biometric sensor, and/or other sensors. Camera device 14 may include, for example, an action camera.

An image sensor may be configured to generate output signals conveying light and/or electromagnetic radiation incident on the image sensor, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

A geo-location sensor may be configured to generate output signals conveying location of a capture device, and/or other information. By way of non-limiting illustration, a geo-location sensor may comprise a GPS, and/or other sensors.

A motion sensor may be configured to generate output signals characterizing motion of a capture device over time. The motion of the capture device characterized by the output signals of the motion sensor may include one or more of speed, acceleration, rotation (e.g., pitch, roll, and/or yaw), orientation, and/or other motion. A motion sensor may include an inertial measurement unit, and/or other devices. By way of non-limiting illustration, a motion sensor may include one or more of an accelerometer, a gyroscope, a magnetometer, and/or other devices.

A sound transducer may be configured to generate output signals conveying changes in pressure indicative of sound waves incident on the sound transducer. The output signals may characterize audio content of a video. By way of non-limiting illustration, a sound transducer may include a microphone.

An environment sensor may be configured to generate output signals conveying ambient environment information. Ambient environment information may include one or more of altitude, depth, ambient light, and/or other information. By way of non-limiting illustration, an environment sensor may include one or more of an altimeter, a pressure sensor, a light sensor, and/or other sensors.

A biometric sensor may be configured to generate output signals conveying biometric information. Biometric information may include one or more of heart rate, breathing rate, blood pressure level, the current position, location, and/or direction of a user's face, eyes, and/or gaze, and/or other biometric information. By way of non-limiting illustration, a biometric sensor may include one or more of a blood pressure sensor, a pulse oximeter, a heart rate sensor, a Blood Alcohol Concentration (BAC) sensor, and/or other sensors.

Returning to FIG. 1, although processor 11 and electronic storage 12 are shown to be included in computing platform 15, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 20-28 may be eliminated, and some or all of its functionality may be provided by other computer program components. As another example, processor 11 may be configured to execute one or more additional computer program components that may perform some or all of the functionality attributed to one or more of computer program components 20-28 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may include one or more virtual storage resources (e.g., cloud storage, a virtual private network, and/or other virtual storage resources). Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 5:
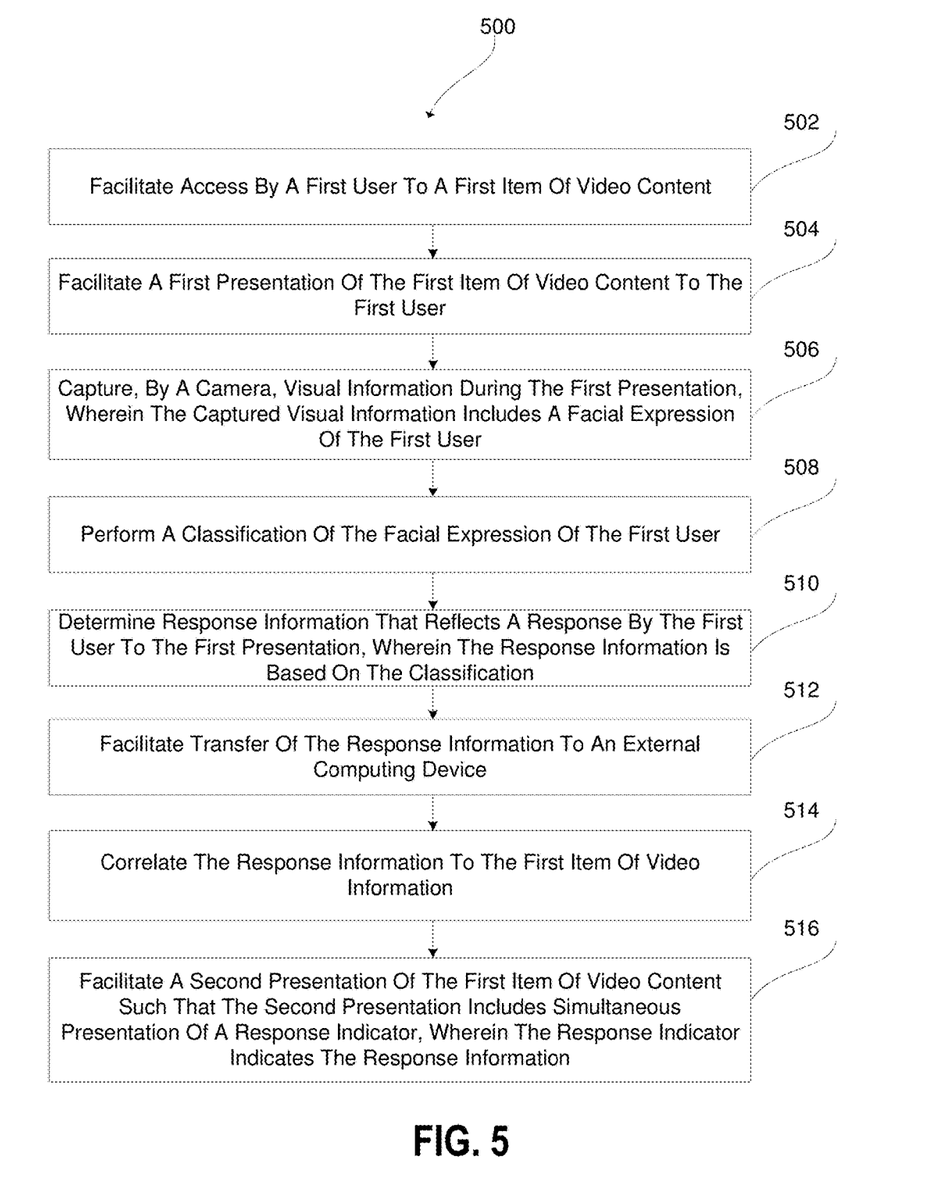
FIG. 5 illustrates a method of automatically detecting user responses from users to media content and correlating the user responses to the media content, in accordance with one or more implementations.

FIG. 5 illustrates a method 500 of automatically detecting user responses from users to media content and correlating the user responses to the media content, in accordance with one or more implementations. The operations of method 500 presented below are intended to be illustrative. In some implementations, method 500 may be accomplished with one or more additional operations not described, and/or without one or more of the operations discussed. In some implementations, two or more of the operations may occur substantially simultaneously.

In some implementations, method 500 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 500.

Referring to FIG. 5 and method 500, at an operation 502, access by a first user to a first item of video content is facilitated. In some embodiments, operation 502 is performed by an access component the same as or similar to access component 20 (shown in FIG. 1 and described herein).

At an operation 504, a first presentation of the first item of video content to the first user is facilitated. In some embodiments, operation 504 is performed by a presentation component the same as or similar to presentation component 24 (shown in FIG. 1 and described herein).

At an operation 506, visual information is captured during the first presentation. The captured visual information includes a facial expression of the first user. In some embodiments, operation 506 is performed by a capture component the same as or similar to capture component 25 (shown in FIG. 1 and described herein).

At an operation 508, a classification of the facial expression of the first user is performed. In some embodiments, operation 508 is performed by a classification component the same as or similar to classification component 26 (shown in FIG. 1 and described herein).

At an operation 510, response information is determined that reflects a response by the first user to the first presentation. The response information is based on the classification. In some embodiments, operation 510 is performed by a response component the same as or similar to response component 22 (shown in FIG. 1 and described herein).

At an operation 512, transfer of the response information to an external computing device is facilitated. In some embodiments, operation 512 is performed by a transfer component the same as or similar to transfer component 28 (shown in FIG. 1 and described herein).

At an operation 514, the response information is correlated to the first item of video information. In some embodiments, operation 514 is performed by a correlation component the same as or similar to correlation component 23 (shown in FIG. 1 and described herein).

At an operation 516, a second presentation of the first item of video content is facilitated such that the second presentation includes simultaneous presentation of a response indicator. The response indicator indicates the response information. In some embodiments, operation 516 is performed by a presentation component the same as or similar to presentation component 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for automatically detecting user responses from users to media content and correlating the user responses to the media content, the system comprising:
one or more physical processors configured by machine-readable instructions to:
obtain images including facial expressions of users during presentation of video content to the users, the images including a first image and a second image, the first image including a facial expression of a first user during the presentation of the video content to the first user and the second image including a facial expression of a second user during the presentation of the video content to the second user;
perform classification of the facial expressions of the users based on the images such that the facial expression of the first user is classified based on the first image and the facial expression of the second user is classified based on the second image;
determine individual items of response information that reflect user responses to the presentation based on the classification of the facial expressions of the individual users, the items of response information including a first item of response information reflecting the first user's response to the presentation and a second item of response information reflecting the second user's response to the presentation, wherein the individual items of response information correspond to individual emojis such that the first item of response information corresponds to a first emoji and the second item of response information corresponds to a second emoji;
aggregate the items of response information into aggregated response information, the aggregated response information corresponding an aggregated emoji, wherein the first emoji and the second emoji are of a given type of emoji, and the aggregated emoji is of the given type of emoji and characterized by a different size or brightness than the first emoji and the second emoji; and
correlate the aggregated response information to the video content such that subsequent presentation of the video content includes simultaneous presentation of the aggregated emoji.

2. The system of claim 1, wherein the first image is captured by a front-facing camera.

3. The system of claim 1, wherein the aggregated response information is associated with a time-stamp, and wherein presentation of the aggregated emoji is timed in accordance with the time-stamp.

4. The system of claim 1, wherein the one or more physical processors are further configured by the machine-readable instructions to:
detect one or more moments of interest in the video content based on the aggregated response information; and
create a highlight reel including at least one of the one or more moments of interest.

5. The system of claim 1, wherein the aggregated emoji is animated, and wherein animation of the aggregated emoji is in accordance with changes in the facial expressions of the users.

6. The system of claim 3, wherein the images further include a third image including a second facial expression of the first user, and wherein the one or more physical processors are further configured to:
perform classification of the second facial expression;
determine the first item of response information further based on the classification of the second facial expression, wherein the first emoji changes based on the second facial expression.

7. The system of claim 1, wherein the first item of response information is determined based on classification of a biometric parameter of the first user, the biometric parameter determined based on biometric information conveyed by output signals of a biometric sensor.

8. The system of claim 1, wherein the items of response information are aggregated into aggregated response information based on individual user responses occurring at a same moment of the video content.

9. The system of claim 1, wherein the items of response information are aggregated into aggregated response information regardless of whether individual user responses occurred at a same moment or different moments of the video content.

10. The system of claim 1, wherein the aggregated response information is modified based on obtaining new images including new facial expressions of the users or other users.

11. A computer-implemented method to automatically detect user responses from users to media content and correlate the user responses to the media content, the method being implemented on a computing system that includes one or more processors configured by machine-readable instructions, the method comprising:
 obtain images including facial expressions of users during presentation of video content to the users, the images including a first image and a second image, the first image including a facial expression of a first user during the presentation of the video content to the first user and the second image including a facial expression of a second user during the presentation of the video content to the second user;
 performing classification of the facial expressions of the users based on the images such that the facial expression of the first user is classified based on the first image and the facial expression of the second user is classified based on the second image;
 determining individual items of response information that reflect user responses to the presentation based on the classification of the facial expressions of the individual users, the items of response information including a first item of response information reflecting the first user's response to the presentation and a second item of response information reflecting the second user's response to the presentation, wherein the individual items of response information correspond to individual emojis such that the first item of response information corresponds to a first emoji and the second item of response information corresponds to a second emoji;
 aggregating the items of response information into aggregated response information, the aggregated response information corresponding an aggregated emoji, wherein the first emoji and the second emoji are of a given type of emoji, and the aggregated emoji is of the given type of emoji and characterized by a different size or brightness than the first emoji and the second emoji; and
 correlating the aggregated response information to the video content such that subsequent presentation of the video content includes simultaneous presentation of the aggregated emoji.

12. The method of claim 11, wherein the first image is captured by a front-facing camera.

13. The method of claim 11, wherein the aggregated emoji is animated, and wherein animation of the aggregated emoji is in accordance with changes in the facial expressions of the users.

14. The method of claim 11, wherein the first item of response information is determined based on classification of a biometric parameter of the first user, the biometric parameter determined based on biometric information conveyed by output signals of a biometric sensor.

15. The method of claim 11, wherein the aggregated response information is associated with a time-stamp, and wherein presentation of the aggregated emoji is timed in accordance with the time-stamp.

16. The method of claim 15, wherein the images further include a third image including a second facial expression of the first user, the method further comprising:
 performing classification of the second facial expression;
 determining the first item of response information further based on the classification of the second facial expression, wherein the first emoji changes based on the second facial expression.

17. The method of claim 11, wherein the items of response information are aggregated into aggregated response information based on individual user responses occurring at a same moment of the video content.

18. The method of claim 11, wherein the items of response information are aggregated into aggregated response information regardless of whether individual user responses occurred at a same moment or different moments of the video content.

* * * * *